Feb. 23, 1926.
H. M. PFLAGER
1,573,994
BOOSTER MOTOR SUPPORT
Filed Jan. 22, 1924
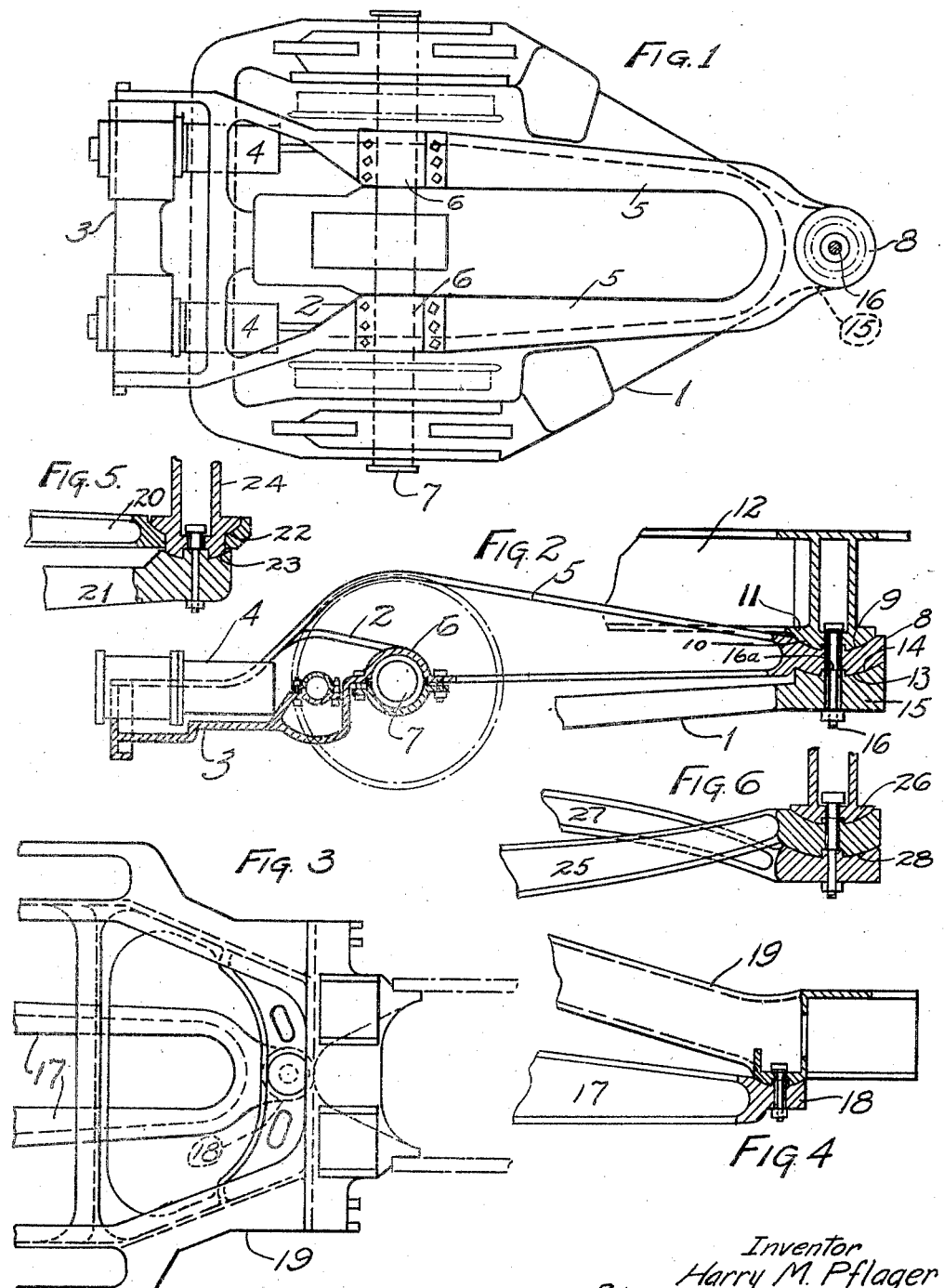
Inventor
Harry M. Pflager
By Cornwall, Bedell & James
Attys.

Patented Feb. 23, 1926.

1,573,994

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

BOOSTER-MOTOR SUPPORT.

Application filed January 22, 1924. Serial No. 687,843.

*To all whom it may concern:*

Be it known that I, HARRY M. PFLAGER, a citizen of the United States, residing at St. Louis, Missouri, have invented a certain new and useful Improvement in Booster-Motor Supports, of which the following is a specification, such as will enable others skilled in the art to which it appertains to make and use the same.

My invention relates to railroad rolling stock and consists in a new means for mounting a booster motor in a locomotive.

Booster motors are usually carried upon the frame of the truck, the axle of which is connected to and driven by the booster motor. The objects of my invention are to relieve the truck frame from the weight of the motor and to distribute the stresses due to the weight of the motor to the locomotive frame and preferably in advance of the truck axle to which the booster motor is connected.

In the preferred form of my invention illustrated in the accompanying drawings, the booster motor frame is in the form of a cantilever mounted between its ends upon the axle of a trailer truck, carrying the booster motor on the rear end and having its forward end engaging a member of the locomotive frame in front of the trailer truck axle.

In these drawings—

Figure 1 is a top view of a radial trailer truck having my improved booster motor frame carried on the axle thereof.

Figure 2 is a longitudinal vertical section through the booster motor frame and indicating portions of the trailer truck and the locomotive frame.

Figure 3 is a top view of the forward end of a non-radial trailer truck frame or locomotive frame member with the forward end of the booster motor frame applied thereto.

Figure 4 is a longitudinal vertical section through the connection between the booster motor frame and the locomotive frame member.

Figures 5 and 6 illustrate modifications referred to below.

In the radial trailer truck construction indicated in Figures 1 and 2 the trailer truck frame is shown at 1 and the booster motor frame at 2. The rear end of the booster motor frame forms an engine bed 3 upon which the booster motor 4 is carried and the forward end of the motor frame consists of spaced arms 5 provided with bearings 6 through which the frame is carried on the truck axle 7. At their forward ends arms 5 are united to form a central locomotive frame bearing 8, here shown as a concavo-convex member having an upwardly facing spherical surface 9 which engages a downwardly facing correspondingly shaped surface 10 formed on the lower face of member 11 on the locomotive frame 12. The lower face 13 of member 8 is also spherical in shape and fits a correspondingly shaped surface 14 provided on the upper face of the forward end 15 of the trailer truck frame 1.

The members 8, 11 and 15 are secured together by a bolt 16 shouldered at 16ª, and form a common universal joint which permits the booster motor frame and trailer truck frame to swing independently of each other in a vertical plane and independently of the locomotive frame. The trailer truck and booster motor frame can also swing in a horizontal plane independently of the locomotive frame. The booster motor frame and trailer truck frame will move together in a horizontal plane as axle 7 will control such pivotal movement of the booster motor frame. Any relative movement between the booster motor frame and truck frame due to any play between the motor frame bearings on axle 7 and between the truck journal box bearings on the axle will be accommodated by the ball and socket joint at the forward end of the motor and truck frames.

In the construction shown in Figures 3 and 4 no radial truck frame is provided, the booster engine frame 17 being secured at its forward end 18 to the locomotive frame member 19 by means of the ball and socket joint as shown in Figure 2. It will be understood that the booster frame 17 is carried upon the axle of the truck which supports the rear end of cradle 19 and that the booster frame extends rearwardly beyond this axle to carry the booster engine similar to the arrangement shown in Figure 2.

In the construction shown in Figure 5 the booster frame 20 and truck frame 21, respectively, engage spherical seats 22 and 23 provided on the locomotive frame cross brace 24. Here the booster frame and truck frame pivot on the locomotive free from any clamping of the one by the other, In Figure 6 I show the truck frame 25 as seated against the locomotive cross brace 26 and the booster frame 27 as straddling the inner end of the truck frame and seated against the spherical lower face 28 of the latter. This construction also eliminates a clamping or pinching action on the booster frame by the truck frame.

In all of these constructions the truck frame or the rear end of the locomotive is relieved of the weight of the booster motor which is carried on the truck axle by means of the cantilever motor frame and the stresses not taken care of by the axle are transmitted to the locomotive frame forwardly of the truck to which the booster motor is connected. Although secured to the main frame, directly or indirectly, the booster motor frame may pivot freely in every direction relatively thereto so that the motor can move with axle 7 at all times.

Various other modifications in the details and construction of my device may be made without departing from the spirit of my invention as expressed in the accompanying claims.

I claim:

1. In a locomotive, a main frame, a trailer axle having pivotal movement relative to said frame, a horizontal member secured near one end to said frame, supported intermediate its ends on said axle and pivoting therewith, and a booster motor carried by said member near its opposite end.

2. In a locomotive, a main frame, a trailer truck axle, and a booster motor frame secured to said main frame on one side of said axle and carrying a booster motor on the other side of said axle.

3. In a locomotive, a main frame, a truck axle, and a booster motor frame pivotally mounted intermediate its ends on said axle, carrying a booster motor at one end and pivotally connected to said main frame at its opposite end.

4. In a locomotive, a main frame, a truck axle, and a booster motor frame pivotally mounted intermediate its ends on said axle, carrying a booster motor at one end and at its other end connected to said main frame through a universal joint.

5. In a locomotive, a main frame, a trailer truck, and a booster motor frame carried by said truck and by said main frame, said truck and said motor frame being secured to said main frame on the same side of the wheels of said truck.

6. In a locomotive, a main frame, a trailer truck frame, and a booster motor frame, said truck frame and motor frame being secured to said main frame at a common point.

7. In a locomotive, a main frame, a trailer truck frame pivoted thereto, and a booster motor frame pivoted to said main frame on the same axis as said truck frame.

8. In a locomotive, a main frame, a trailer truck frame, a booster motor frame, and a common universal joint connection between said frames.

9. In a locomotive, a main frame, a trailer truck, a booster motor frame supported on said truck, a universal joint connection between said motor frame and said main frame, a frame for said truck, and a universal joint connection between said truck frame and said motor frame.

10. In a locomotive, a truck axle, a truck frame, a booster motor, and a cantilever member supported between its ends on said axle for carrying said motor and supported at its anchored end through a universal joint connection to the locomotive.

11. In a locomotive, a main frame, a trailer axle, a horizontal member secured near one end to said frame, supported intermediate its ends on said axle, and a booster motor carried by said member near its opposite ends.

12. In a locomotive, a trailer truck, and a booster motor frame pivotally mounted on said truck to swing in a vertical plane and pivoted directly to said locomotive frame to swing in a horizontal plane.

13. In a locomotive, a trailer truck, and a booster motor frame pivotally mounted on said truck to swing in a vertical plane and provided with arms extending forwardly from said truck and terminating in an upwardly facing bearing adapted to engage the locomotive frame.

14. In a locomotive, a main frame including a downwardly facing spherical bearing, a trailer truck frame including an upwardly facing spherical bearing beneath said main frame bearing, a booster motor frame including upwardly and downwardly facing spherical bearings adapted to fit between said main frame bearing and said truck frame bearing, and means for securing said bearings together.

15. A locomotive booster engine frame comprising an engine bed at one end, a locomotive frame bearing at its opposite end and a truck axle bearing intermediate its ends.

16. A locomotive booster engine frame comprising an engine bed at one end, and spaced longitudinal arms extending forwardly from said bed provided with truck axle bearings and united at their forward ends to form a central locomotive frame bearing.

In testimony whereof I hereunto affix my signature this ninth day of January, 1924.

H. M. PFLAGER.